United States Patent
Wilson et al.

(10) Patent No.: US 10,081,052 B2
(45) Date of Patent: Sep. 25, 2018

(54) CASTING OF ENGINE PARTS

(71) Applicant: ROLLS-ROYCE PLC, London (GB)

(72) Inventors: Paul J Wilson, Derby (GB);
Christopher Neale, Derby (GB);
Andrew S Barr, Derby (GB)

(73) Assignee: ROLLS-ROYCE plc, London (GB)

( * ) Notice: Subject to any disclaimer, the term of this patent is extended or adjusted under 35 U.S.C. 154(b) by 351 days.

(21) Appl. No.: 14/826,895

(22) Filed: Aug. 14, 2015

(65) Prior Publication Data

US 2016/0067769 A1    Mar. 10, 2016

(30) Foreign Application Priority Data

Sep. 5, 2014    (GB) .................................... 1415726.7

(51) Int. Cl.
*B22C 9/10*    (2006.01)
*B22C 9/24*    (2006.01)
*F01D 5/18*    (2006.01)

(52) U.S. Cl.
CPC ................ *B22C 9/24* (2013.01); *B22C 9/103* (2013.01); *F01D 5/187* (2013.01); *F05D 2230/21* (2013.01); *F05D 2260/22141* (2013.01); *Y02T 50/676* (2013.01)

(58) Field of Classification Search
CPC .............. B22C 9/10; B22C 9/103; B22C 9/24
USPC ....................................... 164/369, 30, 31, 32
See application file for complete search history.

(56) References Cited

U.S. PATENT DOCUMENTS 4,487,246 A    12/1984    Frasier
5,296,308 A    3/1994    Caccavale et al.
6,347,660 B1 *    2/2002    Sikkenga et al. ........ B22C 7/026
                                                                  164/137
6,626,230 B1 *    9/2003    Woodrum et al. ........ B22C 1/22
                                                                  164/137
7,442,008 B2    10/2008    Kopmels et al.
(Continued)

FOREIGN PATENT DOCUMENTS

EP           1630354 A2    3/2006
GB           2 281 238 A    3/1995
WO           00/78480 A1    12/2000

OTHER PUBLICATIONS

Feb. 29, 2016 Search Report issued in European Patent Application No. 15181028.

(Continued)

*Primary Examiner* — Kevin P Kerns
(74) *Attorney, Agent, or Firm* — Oliff PLC

(57) ABSTRACT

Investment casting of an engine part using a pair of core members having respective opposed faces spaced apart by a first distance, a face of a first core member of the pair being provided with one or more protrusions thereon and a face of the second core member of the pair being provided with one or more respective open recesses therein, each protrusion facing a respective open recess, wherein during a casting procedure the first and second core members are maintained positioned relative to each other so major portions of the opposed faces of the first and second core members assume mutual spacing equaling a corresponding predetermined thickness of a portion of a resulting cast wall of the first distance; and at least a head portion of the protrusion is located within the respective open recess to define a minor portion of the resulting cast wall.

14 Claims, 4 Drawing Sheets

Fig. 3

(56) References Cited

U.S. PATENT DOCUMENTS

2002/0129924 A1    9/2002  Brandl et al.
2015/0283603 A1*  10/2015  Propheter-Hinckley .................... B22C 9/103
                                                                    428/34.1

OTHER PUBLICATIONS

Mar. 5, 2015 Search Report issued in British Patent Application No. 1415726.7.

* cited by examiner

CASTING OF ENGINE PARTS

TECHNICAL FIELD

This invention relates to casting of engine parts. More particularly, though not exclusively, it relates to investment casting of engine parts such as turbine blades, especially (though not necessarily) turbine blades having internal cast walls.

BACKGROUND OF THE INVENTION AND PRIOR ART

Investment casting processes are widely used to create hollow, near net-shape metal components, e.g. turbine blades, by pouring molten metal into a ceramic mould of the desired final shape and subsequently removing the ceramic. The process is an evolution of the lost-wax process, wherein a component of the size and shape required in metal is manufactured in wax using wax injection moulding, which pattern is then dipped in ceramic slurry to create a shell; the wax is then removed and the shell fired in order to harden it. The resulting shell thus has one or more open cavities therewithin for receiving molten metal when poured inside, the cavities being of the size and shape required for the final component, e.g. a turbine blade.

Often engine parts are required to have complex internal cavities for the purpose of acting as internal cooling channels. To form such internal cavities, at least one, and often several, ceramic core(s) is/are required in order to define and form the internal channels during the casting process. The cores are manufactured separately and placed inside the wax pattern die prior to wax injection. After casting the alloy the cores are leached out with alkaline solution to leave the hollow metal component.

Ceramic cores are usually manufactured by particle injection moulding (PIM). A ceramic material, usually silica, is suspended in an organic binder (vehicle) to create a feedstock, which is then injected into a die cavity of the required size and shape to create a "green" component comprising the ceramic and binder. The binder is subsequently thermally or chemically removed and the ceramic consolidated by sintering at elevated temperatures, to give the final ceramic core.

Recently advanced cooling concepts applied to turbine blades for use in gas turbine engines often require a complex configuration of core passages to give the most efficient level of cooling on the final component. One design that can give a large improvement in cooling is known as a contraflow-cooled component, as disclosed for example in U.S. Pat. No. 7,442,008B2. An example of such a turbine blade is shown schematically in FIG. 1 of the accompanying drawings. In this design of blade a main core body A and a secondary core body B, each comprising a desired arrangement of cooling air passages 10, are pre-manufactured separately and subsequently assembled together. In the final component this allows cooling air to be passed up certain selected ones of the internal passages and down other selected ones of the passages, in the manner of a contraflow.

Thus, and since a wax pattern for forming the complete core arrangement corresponding to this design of blade cannot be injection moulded as a single piece, it is moulded in two separate pieces which are then assembled together using a fixture to hold the cores in the correct relative positions to the required accuracy during the relevant stages of the casting process. In practice the cores are held together using a fugitive material compatible with the wax injection moulding process and which is able to be removed using the same processes as for a standard investment casting component.

It is known in the art to use so-called "bumpers", or protrusions, on the exterior walls or faces of ceramic cores for controlling integral wall thicknesses of an investment cast component. Examples of such bumpers and their use are disclosed in US2002/0129924A1 and U.S. Pat. No. 5,296,308. However, such bumpers have limited utility in some situations.

Typically, thin or narrow core passages require support in order to maintain their dimensional stability. At the root and tip ends of the blade to be cast this may be readily done via contact with the casting shell. However, according to current practices, intermediate these locations this supporting must be done using thin ceramic pieces which are not required by the blade design but are purely for supporting the core(s) during subsequent processing. This however requires a compromise between design and manufacturing optimisation, as these extra pieces are often detrimental to the cooling effectiveness of the final component. Moreover, for the two-piece assembled core method such as described above and shown in FIG. 1, support between cores A and B of this type is not possible.

This issue may be partially solved through the use of bumpers to maintain desired relative spatial positionings between cores and minimum cast wall thicknesses, especially at particular locations which may be prone to movement or distortion during various stages of casting and onward processing, as disclosed for example in U.S. Pat. No. 5,296,308 mentioned above. Here a series of e.g. circular cross-sectioned bumpers (protrusions) on the outer walls of the various cores engage with an inner wall of an outer ceramic shell mould, leading to the external walls of a resulting cast component being maintained at a desired minimum thickness, despite movement or distortion of the cores' geometries possibly occurring during the casting process.

An arrangement of bumpers of the type disclosed in U.S. Pat. No. 5,296,308 might in principle be considered for application to the assembly of the two-body core arrangement shown in FIG. 1. Doing that may be expected in principle to result in an arrangement of cores 10, regions 20 between the cores corresponding to resulting internal cast walls, with bumpers 30 on the relevant ones of the cores 10, as shown in FIG. 2 of the accompanying drawings. Here, if either of the core bodies A, B moves relatively towards the other during the casting process, then the relevant bumper on the wall of core body B will substantially prevent the relevant core passage(s) from collapsing beyond a minimum allowable amount. However in this case that minimum allowed amount may often turn out to be substantially 0 mm, owing to the bumpers' abutment against the wall of core body A, and thus through-holes may occur in the resulting cast wall at the sites of the respective bumpers 30. The presence of such holes is undesirable, since they may compromise the cooling efficiency of the arrangement of cooling air passages, especially in a contraflow-cooled turbine blade as discussed above.

Even if it were to be considered to manufacture core body B such that its bumpers would not abut the wall of the opposing core body A, and instead would leave a small gap of e.g. of the order of 0.1-0.2 mm therebetween (so that the cast walls between the core bodies A, B would remain intact), then it might be expected that that would result in a casting that would be acceptable for end use as a gas turbine engine turbine blade. However, in practice this is not necessarily so.

Instead, the application of the disclosure of U.S. Pat. No. 5,296,308 to turbine blades having interior cast walls presents a new problem: when used on internal passageways defined by internal cast walls such as those proposed in relation to FIG. 1, which are required to carry most of the blade load when in use, the variable nature of the overall cast surface can cause extremely large stresses to be present in particular locations, particularly at the potential breakthrough point adjacent the head of each bumper. This may well render the resulting blade unsuitable for use in an engine. Thus it not possible simply to apply the known teaching of the use of bumpers in a known manner to the casting of certain walls of many engine parts, especially turbine blades.

WO00/78480 describes a multi-wall ceramic core assembly and method of making same wherein a plurality of individual thin wall, arcuate (e.g. airfoil shaped) core elements are formed in respective master dies to have close tolerance mating locating features that substantially prevent penetration of molten metal between the interlocked features during casting, the individual core elements are fired on ceramic supports to have integral locating features, the prefired core elements are assembled together using the locator features of adjacent core elements, and the assembled core elements are held together using a fugitive material. The multi-wall ceramic core assembly so produced comprises the plurality of spaced apart thin wall, arcuate core elements and located by the mated close tolerance locating features.

SUMMARY OF THE INVENTION

Accordingly it is a primary object of the present invention to ameliorate or at least partially solve at least some of the shortcomings of the above prior art techniques and to provide a system for investment casting of engine parts such as turbine blades in which internal cast wall thicknesses are more accurately maintainable whilst substantially ameliorating or at least to some extent avoiding deleterious localised build-ups of stresses at undesirable locations in the internal cast walls.

The present invention provide and assembly of core members for investment casting of an engine part, a method of forming a wall of an investment-cast engine part, an engine part produced by the casting process according to the appended claims.

Described below there is a process for investment casting of an engine part having at least one internal cast wall, the wall being defined during the casting thereof by a pair of core members having respective ones of a pair of opposed faces, major portions of the said opposed faces being spaced from each other by a first distance corresponding to a predetermined minimum thickness of the major portion of the resulting cast wall, a face of a first core member of the pair which faces a second core member of the pair being provided with one or more protrusions thereon, and a face of the second core member of the pair which faces the first core member of the pair being provided with one or more respective recesses therein, the or each respective protrusion on the first core member facing the or a respective one of the said recesses in the second core member, wherein during at least part of the casting procedure the first and second core members are maintained in a spatial position relative to each other such that: the said major portions of the opposed faces of the first and second core members assume a mutual spacing which substantially equals the said first distance corresponding to the predetermined minimum thickness of the major portion of the resulting cast wall; and at least a head portion of the or each protrusion on the first core member is located within the or a respective recess in the second core member, such that the or each respective protrusion and the or each respective recess define therebetween a respective minor portion of the resulting cast wall which is laterally displaced from the major portion of the resulting cast wall.

As used herein the term "laterally displaced" (or "lateral displacement", as the case may be) means spaced in a direction substantially normal (i.e. perpendicular) to a plane defined by or contained within the major portion of the cast wall in the vicinity of or adjacent the site of the respective minor cast wall portion(s). In other words, the respective minor cast wall portion is spaced from that major cast wall portion in a direction such that the respective minor cast wall portion is non-coplanar with the major cast wall portion, i.e. such that the minor cast wall portion lies out of the plane of the major cast wall portion in the vicinity of or adjacent the site of the minor cast wall portion.

The or each respective minor portion of the resulting cast wall may thus be defined as a region or portion of the cast wall comprising, or contained within, the or each respective recess in the face of the second core member of the pair.

Correspondingly, the major portion of the resulting cast wall may thus be defined as regions or portions of the cast wall other than those defined as the said one or more minor portions thereof. In other words, the major portion of the resulting cast wall may preferably be defined as the regions or portions thereof formed to either side of or surrounding the or each respective recess in the face of the second core member and generally having the said predetermined minimum wall thickness.

There is also described an assembly of core members for use in an investment casting process for forming an engine part having at least one internal cast wall, wherein the assembly comprises: at least two core members defining a pair thereof and having respective ones of a pair of opposed faces, major portions of the said opposed faces being spaced from each other by a first distance corresponding to a predetermined minimum thickness of a major portion of the resulting cast wall, a face of a first core member of the pair which faces a second core member of the pair being provided with one or more protrusions thereon, and a face of the second core member of the pair which faces the first core member of the pair being provided with one or more respective recesses therein, the or each respective protrusion on the first core member facing the or a respective one of the said recesses in the second core member, the first and second core members being maintainable during at least part of the casting procedure in a spatial position relative to each other such that: the said major portions of the opposed faces of the first and second core members assume a mutual spacing which substantially equals the said first distance corresponding to the predetermined minimum thickness of the major portion of the resulting cast wall; and at least a head portion of the or each protrusion on the first core member is located within the or a respective recess in the second core member, such that the or each respective protrusion and the or each respective recess define therebetween a respective minor portion of the resulting cast wall which is laterally displaced from the major portion of the resulting cast wall.

The assembly of core members may be an assembly of two or more core members defining a pair thereof as defined herein.

There may be provided a core, e.g. a ceramic core, for use in casting an engine part by an investment casting process, the core being: either (i) a first core member per se as defined herein in the context of the first or second aspects or any embodiment of either thereof, for use or when used in the process according to the first aspect or any embodiment thereof; or (ii) a second core member per se as defined herein in the context of the first or second aspects or any embodiment of either thereof, for use or when used in the process according to the first aspect or any embodiment thereof.

Conveniently in the respective first core members the or each protrusion may be formed therein by virtue of being integrally formed therewith, e.g. by appropriate adjustment of its outer wall shape during its manufacture, in accordance with known techniques.

The or each recess may be formed in the respective core member by appropriate adjustment of its outer wall shape during its manufacture, in accordance with known techniques.

Optional or preferred features of core members as defined above may correspond to any of the optional or preferred features of any respective embodiment core member as defined herein in the context of the other aspects described herein.

There is described a method of forming an internal wall of an investment-cast engine part, the wall being defined during the casting thereof by a void formed between a pair of core members having respective ones of a pair of opposed faces, major portions of the said opposed faces being spaced from each other by a first distance corresponding to a predetermined minimum thickness of a major portion of the resulting cast wall, a face of a first core member of the pair which faces a second core member of the pair being provided with one or more protrusions thereon, and a face of the second core member of the pair which faces the first core member of the pair being provided with one or more respective recesses therein, the or each respective protrusion on the first core member facing the or a respective one of the said recesses in the second core member, wherein during at least part of the casting procedure the first and second core members are maintained in a spatial position relative to each other such that: the said major portions of the opposed faces of the first and second core members assume a mutual spacing which substantially equals the said first distance corresponding to the predetermined minimum thickness of the major portion of the resulting cast wall; and at least a head portion of the or each protrusion on the first core member is located within the or a respective recess in the second core member, such that the or each respective protrusion and the or each respective recess define therebetween a respective minor portion of the resulting cast wall which is laterally displaced from the major portion of the resulting cast wall.

There is described an engine part formed by investment casting and having at least one internal wall with opposed first and second sides, a major portion of the cast wall having a predetermined minimum thickness between the said first and second sides, wherein the cast wall comprises one or more projections on the first side thereof and one or more indents in the second side thereof, the or each respective indent in the second side of the wall facing the or a respective one of the said projections on the first side of the wall, and wherein at least a foot portion of the or each indent in the second side of the wall is located within the or a respective projection on the first side of the wall, such that the or each respective projection and the or each respective indent define therebetween a respective minor portion of the cast wall which is laterally displaced from the major portion of the cast wall.

The engine part may be an engine part, e.g. a turbine blade, produced by the investment casting process according to the first aspect or any embodiment thereof, or it may be an engine part, e.g. a turbine blade, having a wall, especially an internal wall, produced by the process according to the fourth aspect or any embodiment thereof.

There may be provided an engine, such as a gas turbine engine, including a part, especially a turbine blade, according to the sixth aspect or any embodiment thereof.

The at least one wall of the investment-cast engine part, which is formed with the characteristic one or more projections and one or more indents on respective sides thereof, through the use of the subject core members having respective faces with the characteristic one or more recesses therein and protrusions thereon, may be an internal wall thereof, i.e. a wall separating at least two internal cavities within the part, e.g. turbine blade, for passage therethrough of cooling air when the part is in use.

The predetermined minimum thickness of the major portion of the cast wall may typically be for example in the range of from about 0.5 mm to about 2.5 or 3.0 mm, preferably from about 0.6 mm to about 2.4 or 2.5 mm.

A particular advantage to be had from implementing embodiments of the invention in its various aspects is that it is possible to move points or regions of localised high stress, which typically may occur when the part is in use and resulting from localised variations (typically reductions) in the cast wall thickness at or in the vicinity of the minor portions of the cast wall, away from major lines, axes or planes of stress which typically occur within the major portion of the cast wall during use.

Typically such lines, axes or planes of high stress may occur inter alia at, along or in the vicinity of a median axis or plane within the body of the major portion of the cast wall, e.g. generally parallel to the opposed wall sides. By use of the subject protrusion(s) (i.e. "bumper(s)") and recess(es) combinations or units in accordance with the invention, portion(s), region(s) or feature(s) of the engine part that may otherwise experience high stress may thus be displaced, when the part is in use, away from the said main stress field(s), by a distance sufficient to ameliorate, minimise or at least partially eliminate the deleterious and potentially damaging or problematic consequences of wall breakthrough or other stress-induced impairment thereof at locations corresponding to the site(s) of the bumper(s) used to control the thickness of the major portion of the cast wall. This may therefore lead to improved life and/or improved life predictability of the engine part.

The distance by which such localised high stresses may be moved or shifted away from the said main stress field(s)—i.e. the distance corresponding to the said lateral displacement of the respective minor portion(s) of the cast wall from the major portion thereof resulting from the location of at least a head portion of the or each protrusion on the first core member within the or a respective recess in the second core member—may, in typical embodiments, be for example of the order of somewhat less than a millimeter up to a few millimeters, e.g. from about 0.01 or 0.05 or 0.1 mm up to about 0.5 or 1.0 or 1.5 or 2.0 or even up to about 2.5 or 3.0 or more, even possibly up to about 4 or 5 mm.

This relieving of high stresses at key points or regions in the cast wall may thus prolong the life of the cast part, and/or improve its life predictability, and reduce risks of, or possibly even avoid, problematic consequences of wall failure under in-use conditions, which may be expected to occur if the known use of bumpers according to the prior art were to be applied to known turbine blades and other engine parts in the manner as depicted in FIG. 2 of the accompanying drawings.

The investment casting process may, during at least part of the casting procedure the first and second core members, be maintained in a spatial position relative to each other such that as at least the head portion of the or each protrusion on the first core member is located within the or the respective recess in the second core member to define therebetween the or the respective minor portion of the resulting cast wall, the head of the or each protrusion may assume a spacing from a seat (i.e. base or bottom) of the or the respective recess being at least a second distance defining a predetermined minimum thickness of the respective minor portion of the cast wall.

The minimum thickness of the or each minor portion of the cast wall may be in the range of from about 0 to about 1 or 2 or 3 mm, preferably from about 0 to about 1 mm. Thus in many embodiments the said predetermined minimum thickness of the or each minor portion of the cast wall may often be less than the predetermined minimum thickness of the major portion of the resulting cast wall.

The said predetermined minimum thickness of the or each minor portion of the cast wall may be >0, e.g. in the range of from about 0.05 or 0.1 to about 0.5 mm, especially from about 0.1 to about 0.2 mm, e.g. in the region of about 0.16 mm, which takes into account the combined tolerance variations which may typically be encountered in the overall process of casting the said wall. It may be possible for the said predetermined minimum thickness of the or each minor portion of the cast wall to be substantially 0 mm (or near-0 mm), in particular where the head of the or the respective protrusion substantially touches or contacts the seat or bottom of the or the respective recess, which may occur in situations where processing tolerances are in a "worst case" yet it is still important—and indeed it is preferably the result—that the predetermined minimum thickness of the major portion of the cast wall is still maintained and achieved.

Thus, in many practical embodiments it may nevertheless generally be preferred that the spacing between the head of the or each protrusion and the seat (i.e. base or bottom) of the or the respective recess is non-zero, and especially at least a minimum distance such that all the various manufacturing tolerances that stack up during the building up of the relevant cast wall from the manufacture of the initial core members through to the actual casting of the wall itself are accommodated within this defined predetermined minimum thickness of the minor portion(s) of the finished cast wall. In practical embodiments it may be expected that for any given arrangement an optimum value of this predetermined minimum thickness of this or these minor portion(s) of the finished cast wall may depend on several parameters, such as one or more of the local geometry of the cast wall, the target wall thickness of the major portion of the cast wall, the geometry of the protrusion(s) (bumper(s)) and associated recess(es) on or in the respective core members, the typical operating temperature of the finished part, as well as possibly other parameters.

The step of maintaining the first and second core members in a desired spatial position relative to each other may comprise maintaining the core members in the desired relative position by any suitable one or more support members or support elements.

Suitable support members or elements may be selected from any known types of support member/element known for such purposes, for example any one or more of the following:
platinum pins, e.g. of the order of 1-2 mm in diameter;
platinum chaplets, as disclosed for example in GB2281238A;
a platinum wire woven between and around multiple core passages, as disclosed for example in U.S. Pat. No. 4,487,246.

Further examples of suitable support members/elements may also be available.

The protrusion(s) (or bumper(s)) on the face of the first core member, and thus the indent(s) in the corresponding second side of the resulting cast wall, and likewise the recess(es) in the face of the second core member, and thus the projection(s) on the corresponding first side of the resulting cast wall, may each be of any suitable size, shape and/or geometry.

For example, each protrusion (bumper) may be, or have a head portion which is, substantially cylindrical in shape. It may for example have a tip portion which is substantially rounded, convex, pointed, flat or even other shaped, optionally with edges which blend smoothly into, or may even be bevelled with respect to the adjacent side walls of the main body of the protrusion (bumper).

Although one preferred cross-sectional shape of each protrusion (bumper) may be circular, other cross-sectional shapes may be possible. For example, each protrusion (bumper) may have a generally substantially elliptical cross-section, or a cross-section corresponding to the perimeter of a racetrack, i.e. generally elliptical but with flattened, i.e. straight, major side portions. In the case of non-circular-sectioned bumpers, it may be preferred that they are oriented during the casting process such that their major axis is oriented generally parallel to the cast wall or the plane of one or both of the wall's first and second sides immediately adjacent the site of, or in the vicinity of, the respective bumper. This is because orienting an e.g. elliptical bumper with its major axis aligned with the main stress field in the resulting cast wall may lead to the projected area thereof being smaller than it otherwise would be. This may reduce peak stresses on the bumper, since it may reduce the disturbance of the main stress field in the main load/stress field direction in the resulting cast wall.

Suitable sizes, especially lengths, of each protrusion (bumper) may depend on the overall size and scale of the engine part being cast, as well as on other parameters such as one or more of the local geometry of the cast wall, the target wall thickness of the major portion of the cast wall, the chosen geometry of the protrusion (bumper) and associated recess themselves, typical operating temperature of the finished part, as well as possibly other parameters. Generally it may be preferred that the length of each protrusion (bumper) is minimised for a given size (i.e. depth) of respective recess, in order to reduce stresses therein and to reduce risk of breakage thereof during the manufacture of the core(s) and the overall casting process.

The or each recess in the face of the second core member, corresponding to the one or more respective projections on the second side of the resulting cast wall may likewise be of any suitable size, shape and/or geometry.

For example, each recess in the second core member may preferably be sufficiently wide and deep so as at least to accommodate the preferred protrusion (bumper) therein whilst preferably maintaining around at least the head portion of the protrusion (bumper), in the region defining the or the respective minor portion of the resulting cast wall, its preferred predetermined minimum thickness. Additionally each recess (and thus resulting projection) may also preferably be sufficiently wide and deep so as to allow for and accommodate the usual process variation tolerances of typical industrial core manufacture. Within the above preferred constraints, however, each recess in the second core member may have any suitable cross-sectional shape, e.g. rectangular, circular, elliptical, racetrack-shaped, or other suitable shape. Suitably in some embodiments each recess may have a cross-sectional shape which substantially matches the cross-sectional shape of the respective protrusion (bumper).

Each protrusion (bumper), or at least the head portion thereof, on the first core member may have a length substantially corresponding or equal to a depth of each respective recess in the second core member. This may preferably be so that the above-defined predetermined minimum cast wall thickness of the major portion(s) of the wall is maintained not only in that major portion, but also preferably in the localised minor portion(s) thereof. This may for example assist in the formation of a cast wall with a thickness which may be substantially uniform over both its major and minor portions.

It may also be preferred that each recess in the second core member (and thus protrusion in the resulting cast wall) is formed with a minimum size such that a need for additional metal on the resulting cast part is reduced or minimised. Thus, adding additional weight to the resulting cast part, owing to the introduction of the characteristic protrusion(s) thereon by use of the characteristic recess(es) in the second core member used to cast it, is preferably to be avoided or minimised. This is preferably whilst ensuring that the head portion of the respective protrusion or bumper sits beyond (especially as far beyond as possible, taking into account all other relevant parameters) the line or axis of the main load path in the body of the cast wall, i.e. so as to be displaced into the respective minor portion of the wall at the site of or containing the respective indent therein corresponding to the respective recess on the second core member, and preferably taking into account and accommodating the stacked tolerances from the various manufacturing processes, as referred to above.

More importantly, it may be preferred that the width or diameter of each recess is selected so as to be a minimum for a given size of respective bumper, in order to maximise the overall effect of the stress reduction in the associated portion or site in the cast wall. Moreover, it may be preferred to minimise (as far as possible) the depth of each recess, in order to minimise any disruption of cooling air ultimately flowing in the resulting internal passage formed by the respective core.

The investment casting process may be used to cast a wide variety of engine parts, but it is especially applicable to the casting of high-performance engine parts such as turbine blades, such as for use in a gas turbine engines e.g. for aircraft. Such blades, which are often formed from high-performance metal alloys and required to have a single-crystal metal structure, are desirably formed with metal walls defining various, often complex, internal cavities for the passage of cooling air therethrough which have accurately controlled wall thicknesses and geometries. Moreover the directing or placement of possible localised points, lines or regions of especially high stresses experienced by turbine blades during use, into positions or locations away from or spaced from main stress fields is thus an important consideration for optimum blade manufacture and such blades' ultimate performance. Thus the present invention is especially applicable to the casting of a wide variety of turbine blades and other high-performance engine parts.

Thus turbine blades may be turbine blades of any type. For example, the invention may be applied to the production of turbine blades comprising any number of a plurality of internal passageways defined by any number of a plurality of cores or any number of core bodies, including those of assembled "contraflow" blades as well as those which employ a plurality of single soluble formed cores in contraflow or multi-pass blade designs.

Within the scope of this application it is expressly envisaged that the various aspects, embodiments, examples and alternatives, and in particular the individual features thereof, set out in the preceding paragraphs, in the claims and/or in the following description and drawings, may be taken independently or in any combination. For example features described in connection with one embodiment are applicable to all embodiments, unless such features are incompatible.

BRIEF DESCRIPTION OF THE DRAWINGS

Embodiments of the invention will now be described, by way of example only, with reference to the accompanying drawings, in which.

DETAILED DESCRIPTION OF EMBODIMENTS

Figure 1:
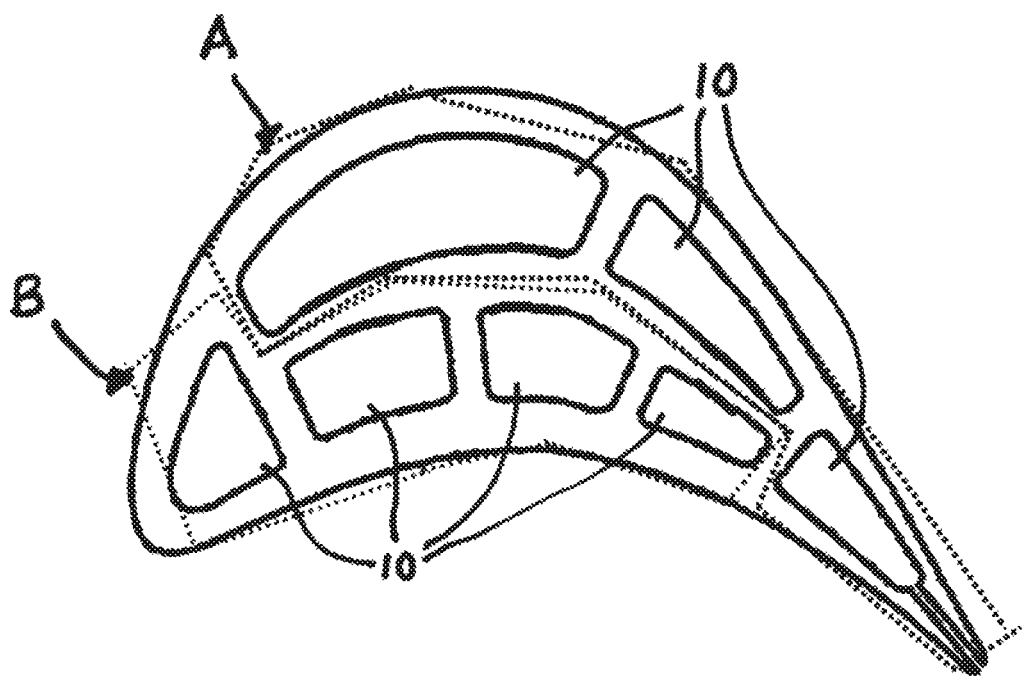
FIG. 1 is a schematic cross-sectional view of a contraflow-cooled turbine blade, e.g. of a gas turbine aircraft engine, as disclosed in U.S. Pat. No. 7,442,008B2, showing its arrangement of cooling air passages within main (A) and secondary (B) core bodies, and as already been described.
Figure 2:
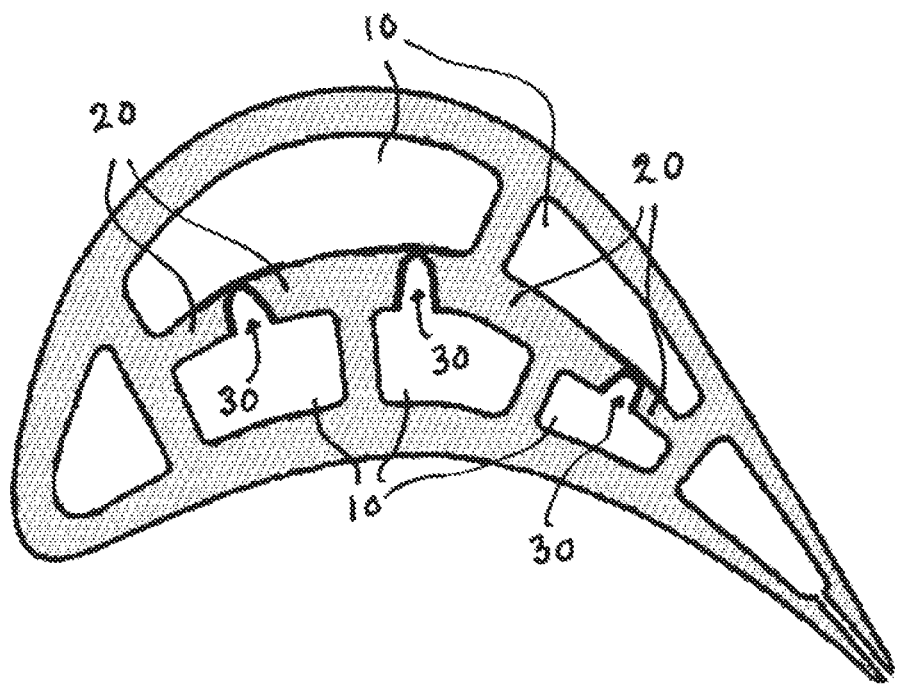
FIG. 2 is an explanatory schematic cross-sectional view of a theoretical arrangement of cores that might in principle be proposed for investment casting of the turbine blade with the core arrangement shown in FIG. 1 using a corresponding technique of bumpers as disclosed in U.S. Pat. No. 5,296,308, and has already been described.
Figure 3:
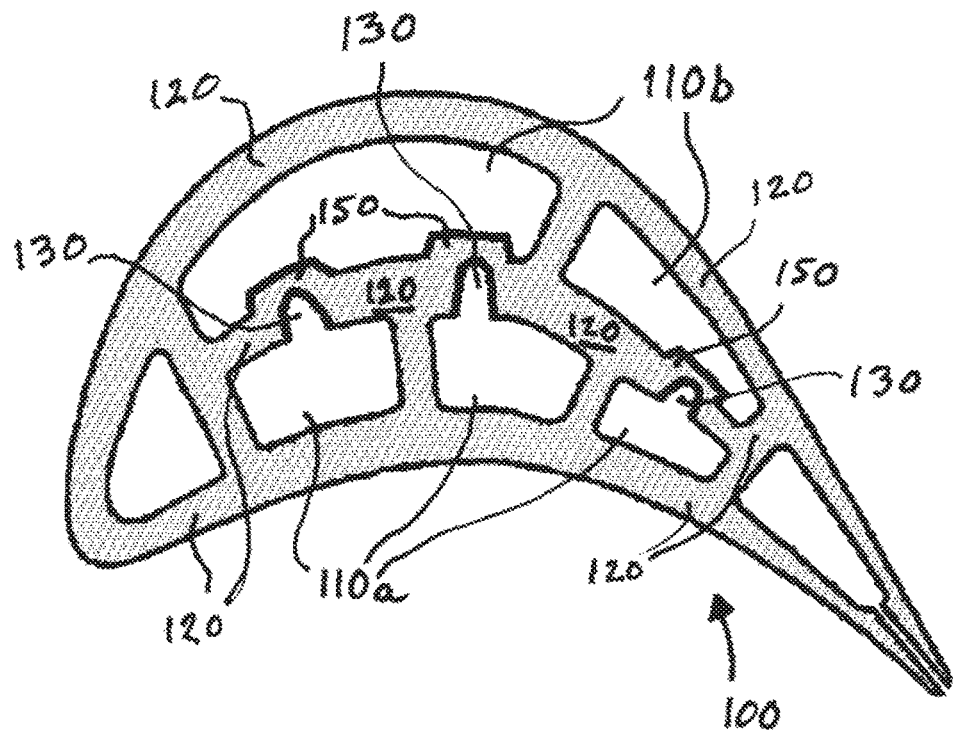
FIG. 3 is a cross-sectional view, corresponding to that of FIG. 2, but showing an embodiment of the present invention in which an arrangement of e.g. circular cross-sectioned bumpers and associated, preferably matching, open recesses on and in the relevant adjacent-facing cores is employed to control the thickness of the internal cast walls and direct in-use stresses therein in an advantageous manner.
Figure 6:
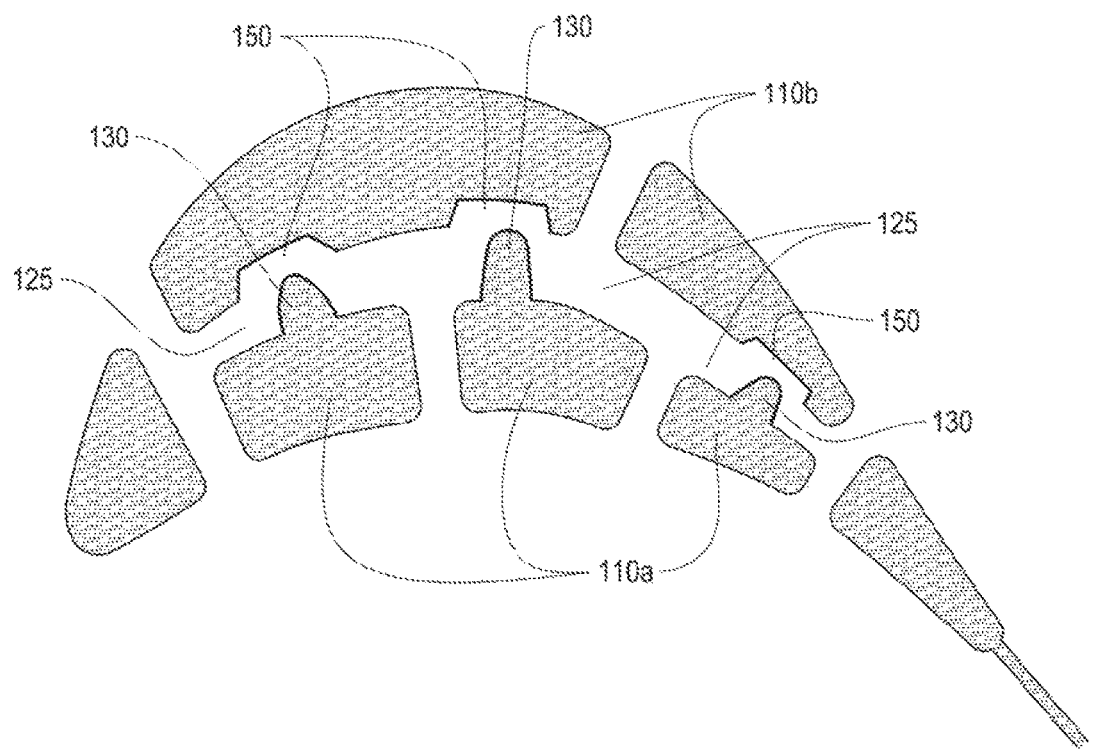
FIG. 6 is a cross-sectional view, corresponding to that of FIG. 3, but showing the cores prior to the formation of the casting walls.

Referring firstly to FIGS. 3 and 6 (FIGS. 1 and 2 having already been described), here there is shown—schematically for purposes of illustration and clarity of this description— an arrangement of ceramic cores 110 a, 110 b used in the production of a high-performance turbine blade 100 for a gas turbine engine by a process of investment casting. Each core 110 a, 110 b defines a cavity in the resulting cast blade for passage therethrough of cooling air, such as in the example "contraflow" blade as disclosed in U.S. Pat. No. 7,442,008B2. During various stages of the investment casting process the cores 110 a, 110 b are maintained in an accurately defined and stable relative spatial configuration, for example by any suitable number and type of core support elements (not shown), as is currently practised in many known investment casting operations, in order to maintain as far as possible a minimum predetermined thickness of the major portion(s) of the resulting cast walls 120 (defined by the relevant spacing(s) of the opposed cores 110 *a*, 110 *b*) once they have been cast. Thus, as shown in FIG. 6, the cores 110 *a*, 110 *b* collectively define a collection of voids 125 therebetween into which a molten metal, e.g. a superalloy, is poured during a pouring step of the investment casting process, so as to form the resulting cast walls (corresponding to the voids between the cores) as a single crystal. The various general principles and individual stepwise procedures of such an investment casting process are well-known and widely commercially used, so need not be described in detail here.

Particularly useful for the application of the present invention are those walls which are internal to the blade 100, i.e. those walls 120 which separate and define at least two internal cavities within the blade 100. Thus, the characteristic, e.g. circular cross-sectioned, protrusions (or "bumpers") 130 and preferably matching open recesses 150 on and in the respective cores 110*a*, 110*b* which are unique to the invention may be provided on any two cores 110*a*, 110*b* which form an opposed pair. Thus, any given one or more cores 110*a* may be provided with one or more bumpers 130 and any given one or more cores 110*b* may be provided with one or more open recesses 150, provided that the respective bumper(s) 130 and open recesses(s) 150 generally face each other and are provided on respective or neighbouring cores 110*a*, 110*b* which are opposed to and face one other and define therebetween a void or gap which is to form an internal wall 120 of the resulting cast blade 100.

From the foregoing description hereinabove it will be understood that in many, if not most or all, of the internal cast walls 120 of the blade 100 during use considerable stress fields will typically be built up within the bodies of the walls, by virtue of the high operating temperatures and pressures, the material and geometries of the various components of the blade, and various other parameters. Because the use of bumpers 130 per se, as taught in principle for example in U.S. Pat. No. 5,296,308, is generally needed for maintaining cast wall thicknesses in a controlled manner, and the indents they leave are required for various onward processing stages of the turbine blade, it is not possible simply to apply the known use of bumpers 130 in a conventional manner. On the contrary, in accordance with the present invention each bumper 130 on the core(s) 110*a* has associated with it a corresponding open recess 150 provided in the outer wall of the respective facing opposed core(s) 110*b*, for the purpose of redistributing the typical high stresses that may be generated or encountered in the minor portions of the resulting cast internal wall(s) 120 corresponding to the locations or regions at which the respective bumpers 130 and open recesses 150 face or approach one another. More correctly, those latter locations or regions are defined by the localised portions or regions of the cast walls 120 at which a head portion of a respective bumper 130 at least partially enters or protrudes into a respective open recess 150. Thus, each respective pair of opposed, facing bumpers 130 and open recesses 150 may thus be considered as a unit or stress-relieving pair combination 130/150, and is responsible for the displacement of the portion, region or feature of the cast wall 120 that would otherwise be highly stressed away from the main stress fields in or associated with the major wall portions to either side of, and surrounding, each such stress-relieving bumper/open recess pair combination 130/150.

Figure 4:
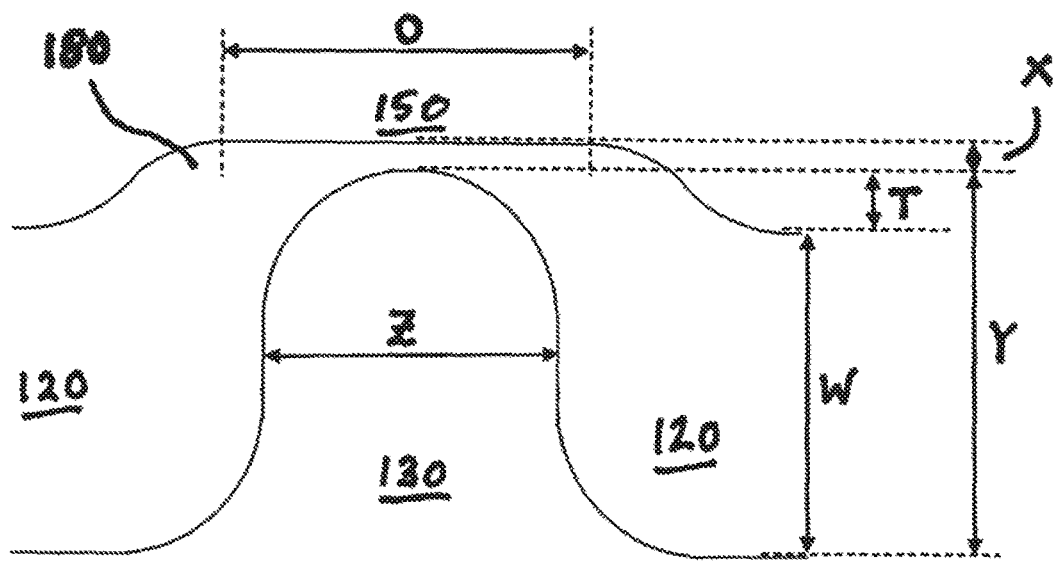
FIG. 4 is an enlarged cross-sectional view of one of the bumper-open recess combinations shown in FIG. 3.

FIG. 4 shows in enlarged cross-section one of the stress-relieving bumper-open recess combinations 130/150 shown in FIG. 3. As shown here, various indicated dimensions may be preferably selected for optimum performance of the stress-relieving bumper-open recess combination 130/150. For example, and as already discussed hereinabove:

W represents a preferred predetermined minimum thickness of the major portion(s) 120 of the resulting cast wall, which in many typical embodiments may be of the order of e.g. from about 0.6 mm to about 2.4 mm.

X represents the preferred predetermined minimum thickness of a localised minor portion 180 of the resulting cast wall, which in many typical embodiments may be of the order of from about 0.1 to about 0.2 mm, especially around 0.16 mm. This represents a typical minimum distance at which, in many practical situations, one can be assured of accommodating all the various "stacked-up" tolerance variations—indicated by distance T—that are typical of the various manufacturing stages of the overall investment casting operation, without risking (or rather whilst minimising any significant likelihood of) breakthrough of the cast wall 120 within the minor portion 180 thereof by the bumper 130 becoming inserted into the open recess 150 too far. Thus, in preferred practical situations the combined distance (X+T) may typically be in the range of from about 0.1 or 0.2 to about 0.5 mm, especially around 0.3 mm. (Alternatively, in certain situations, e.g. in the case of "worst case" tolerances, it may be preferable for the distance X to be selected such that (a) the maximum major wall thickness W is maintained by virtue of the bumper 130 preferably contacting the bottom of the corresponding open recess 150 (e.g. in a case where the bumper 130 is relatively short and the open recess 150 is relatively deep), and (b) the bumper 130 and the bottom of the corresponding open recess 150 are preferably not in contact upon assembly of the core arrangement (e.g. in a case where the bumper 130 is relatively tall and the open recess 150 is relatively shallow), as this may over-constrain the assembly and thus increase risk of core breakage.)

T represents the above-mentioned "tolerance-variation stack".

Y represents the sum of W+T, being a target maximum thickness of the major portion(s) 120 of the resulting cast wall, taking into account the "tolerance-variation stack" T.

Z represents a preferred width of the bumper 130, which in many typical embodiments may be of the order of e.g. around 1 mm.

O represents a preferred maximum width of the bumper 130, taking into account typical tolerance variations in either or both of (i) manufacturing tolerances in the dimensions of the bumper 130 and open recess 150 per se, and/or (ii) any offset relative positioning distance variation arising from relative movement or distortion of the respective cores 110*a*, 110*b* during the investment casting stages.

Figure 5A:
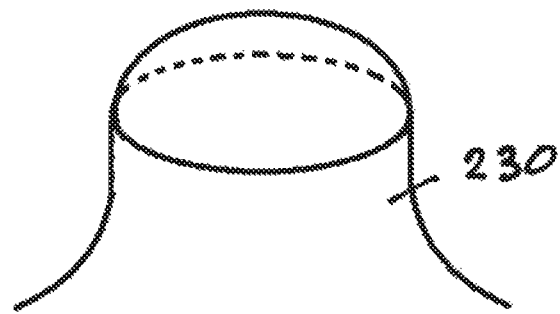
FIGS. 5(a) and (b) are perspective, part-sectional views showing two examples of alternative shapes of bumper suitable for use in embodiments of the invention.

Although the bumper shown in FIG. 4 is shown by way of example as a cylindrical bumper, it may alternatively have alternative cross-sectional shapes, as shown for example in FIGS. 5(*a*) and (*b*).

In the example bumper 230 of FIG. 5(*a*) its rounded-tipped head portion may for instance have an elliptical cross-section, with its major ellipse axis oriented generally parallel to the longitudinal direction of the body of the cast wall, i.e. in the direction of greatest load therein. This is so that the projected area of the bumper in the maximum load direction is minimised. By way of a typical example of a typical turbine blade, the ellipse section may have a width in the direction of its major axis of e.g. of the order of about 1.2 mm, and a width in the direction of its minor axis of e.g. of the order of about 0.8 mm.

Figure 5B:
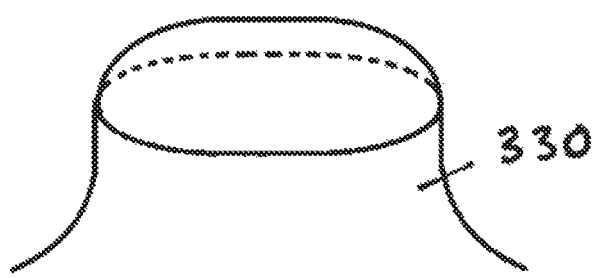

In the example bumper 330 of FIG. 5(b) its rounded-tipped head portion may for instance have a cross-section in the shape of a likewise oriented flattened ellipse, i.e. the perimeter of a "racetrack" with each of its major sides somewhat flattened (i.e. planar major sides over a major proportion of their length). By way of a typical example of a typical turbine blade, the flattened ellipse section may again have a width in the direction of its major axis of e.g. of the order of about 1.2 mm, and a width in the direction of its minor axis, from one of its flattened sides to the other, again of the order of about 0.8 mm.

It is to be understood that the above description of embodiments and aspects of the invention has been by way of non-limiting examples only, and various modifications may be made from what has been specifically described and illustrated whilst remaining within the scope of the invention as defined in the appended claims.

Throughout the description and claims of this specification, the words "comprise" and "contain" and variations of the words, for example "comprising" and "comprises", mean "including but not limited to", and are not intended to (and do not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Furthermore, features, integers, components, elements, characteristics or properties described in conjunction with a particular aspect, embodiment or example of the invention are to be understood to be applicable to any other aspect, embodiment or example described herein, unless incompatible therewith.

The invention claimed is:

1. An assembly of core members for use in an investment casting process for forming an engine part having at least one internal cast wall, wherein the assembly comprises:
at least two core members defining at least one pair thereof and having respective ones of a pair of opposed faces, major portions of the opposed faces being spaced from each other by a first distance corresponding to a predetermined minimum thickness of a major portion of the cast wall,
a face of a first core member of the pair which faces a second core member of the pair being provided with one or more protrusions thereon, and a face of the second core member of the pair which faces the first core member of the pair being provided with one or more respective open recesses therein, each respective protrusion on the first core member facing a respective open recess of the open recesses in the second core member,
the major portions of the opposed faces of the first and second core members assume a mutual spacing which is, within a predetermined tolerance, the first distance corresponding to the predetermined minimum thickness of the major portion of the cast wall; and
at least a head portion of each protrusion on the first core member is located within the respective open recess in the second core member, such that each respective protrusion and the respective open recess define therebetween a respective minor portion of the cast wall which is laterally displaced from the major portion of the cast wall, the major portions and the minor portions of the cast wall forming a continuous wall.

2. An assembly according to claim 1, wherein:
(i) each respective minor portion of the cast wall is a region or portion of the cast wall comprising, or contained within, the respective open recess in the face of the second core member of the pair; and/or
(ii) the major portion of the cast wall is defined as the regions or portions thereof formed to either side of or surrounding the respective open recess in the face of the second core member having a predetermined minimum wall thickness, within a predetermined tolerance.

3. An assembly as according to claim 2, wherein the cast wall of the engine part is an internal wall thereof separating at least two internal cavities within the part.

4. An assembly as according to claim 1, wherein the at least one wall of the engine part is an internal wall thereof separating at least two internal cavities within the part.

5. An assembly according to claim 1, wherein each respective minor portion of the cast wall is laterally displaced from the major portion of the cast wall by a distance of from about 0.01 to about 3.0 mm.

6. An assembly according to claim 1, wherein during at least part of the investment casting process, the first and second core members are maintained in a spatial position relative to each other such that
as at least the head portion of each protrusion on the first core member is located within the respective open recess in the second core member to define therebetween the respective minor portion of the cast wall, the head of each protrusion assumes a spacing from a seat of the respective open recess being at least a second distance defining a predetermined minimum thickness of the respective minor portion of the cast wall.

7. An assembly according to claim 6, wherein the predetermined minimum thickness (X) of each minor portion of the cast wall is in the range of from about 0 to about 3 mm.

8. An assembly according to claim 6, wherein the spacing between the head of each protrusion and the seat of the respective open recess is non-zero and at least a minimum distance such that all manufacturing tolerances that stack up during a building up of the cast wall from the manufacture of the core members through to an actual casting of the cast wall itself are accommodated within the predetermined minimum wall thickness of the minor portion(s) of the cast wall when finished.

9. An assembly according to claim 1, wherein the step of maintaining the first and second core members in a desired spatial position relative to each other comprises maintaining the core members in the desired relative position by one or more support elements.

10. An assembly according to claim 1, wherein each protrusion includes a head portion which has a shape which includes, within a predetermined tolerance, any of:
(i) a cylindrical shape; or
(ii) an elliptical cross-section; or
(ii) a racetrack-shaped cross-section.

11. An assembly according to claim 10, wherein each protrusion is, or has a head portion which has a shape which is, non-circular and is oriented during the casting process such that its major axis is oriented parallel, within a predetermined tolerance, to the cast wall or the plane of one or both if its first and second sides immediately adjacent the site of, or in the vicinity of, the respective protrusion.

12. An assembly according to claim 1, wherein each protrusion, or at least a head portion thereof, on the first core member has a length, within a predetermined tolerance, corresponding or equal to a depth of each respective open recess in the second core member, whereby the predetermined minimum wall thickness of the major portion(s) of the cast wall is maintained not only in that major portion, but also in the minor portion(s) thereof.

13. An assembly according to claim 1, wherein the respective open recess is wider than the head portion so as to provide a clearance space between the respective open recess and the head portion around the head portion in which the minor portion is formed.

14. A method of forming an internal cast wall of an investment-cast engine part, the method comprising:
    forming a void between a pair of core members having respective ones of a pair of opposed faces, major portions of the opposed faces being spaced from each other by a first distance corresponding to a predetermined minimum thickness of a major portion of the internal cast wall;
    providing the pair of core members such that a face of a first core member of the pair which faces a second core member of the pair being provided with one or more protrusions thereon, and a face of the second core member of the pair which faces the first core member of the pair being provided with one or more respective open recesses therein;
    positioning the pair of core members such that each respective protrusion on the first core member faces a respective open recess of the open recesses in the second core member; and
    maintaining during at least part of the casting procedure the first and second core members in a spatial position relative to each other such that:
    the major portions of the opposed faces of the first and second core members assume a mutual spacing which is, within a predetermined tolerance, the first distance corresponding to a predetermined minimum thickness of the major portion of the internal cast wall, and
    at least a head portion of each protrusion on the first core member is located within the respective open recess in the second core member, such that each protrusion and the respective open recess define therebetween a respective minor portion of the internal cast wall which is laterally displaced from the major portion of the internal cast wall, the major portions and the minor portions of the cast wall forming a continuous wall.

* * * * *